(12) United States Patent
Takahashi

(10) Patent No.: US 8,471,544 B2
(45) Date of Patent: Jun. 25, 2013

(54) POWER CONTROLLER FOR SUPPLYING POWER VOLTAGE TO FUNCTIONAL BLOCK

(75) Inventor: Hideyuki Takahashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 13/402,759

(22) Filed: Feb. 22, 2012

(65) Prior Publication Data

US 2012/0159214 A1    Jun. 21, 2012

Related U.S. Application Data

(63) Continuation of application No. 12/458,140, filed on Jul. 1, 2009, now Pat. No. 8,148,965.

(30) Foreign Application Priority Data

Jul. 4, 2008    (JP) .................................. 2008-176061

(51) Int. Cl.
    *G05F 1/00*    (2006.01)

(52) U.S. Cl.
    USPC ............................ 323/283; 323/266; 323/284

(58) Field of Classification Search
    USPC ........................ 323/265, 266, 282, 283, 284
    See application file for complete search history.

(56) References Cited

U.S. PATENT DOCUMENTS

| | | | | |
|---|---|---|---|---|
| 4,292,581 A | * | 9/1981 | Tan .............................. | 323/283 |
| 5,781,000 A | * | 7/1998 | Saeki et al. ................... | 323/234 |
| 5,920,600 A | * | 7/1999 | Yamaoka et al. ............. | 375/376 |
| 6,870,778 B2 | * | 3/2005 | Ozawa et al. ............. | 365/189.09 |
| 6,906,932 B2 | * | 6/2005 | Kung et al. ................. | 363/21.07 |
| 7,038,438 B2 | * | 5/2006 | Dwarakanath et al. ....... | 323/283 |
| 7,117,378 B1 | * | 10/2006 | Maksimovic et al. ........ | 713/300 |
| 7,288,966 B2 | * | 10/2007 | Choi et al. ..................... | 326/83 |

(Continued)

FOREIGN PATENT DOCUMENTS

| | | |
|---|---|---|
| JP | 2003-284322 | 10/2003 |
| JP | 2007-097326 A | 4/2007 |
| JP | 2007-116804 A | 5/2007 |

OTHER PUBLICATIONS

Kimura, et al., "High-Resolution DPWM Generator for Digitally Controlled DC-DC Converters", The 20th Workshop on Circuits and Systems in Karuizawa, Apr. 23-24, 2007, pp. 551-556.
Japanese Notification of Reasons for Refusal dated Oct. 2, 2012, with English-language translation.

*Primary Examiner* — Adolf Berhane
*Assistant Examiner* — Lakaisha Jackson
(74) *Attorney, Agent, or Firm* — McGinn IP Law Group, PLLC

(57) ABSTRACT

A power controller including a processor which outputs a first output signal based on a first voltage in response to a clock signal, a selector which receives the first output signal via a first input terminal, and outputs a second output signal, a holding circuit which outputs a third output signal and holding data, based on the second output signal, a determination circuit which outputs a selector signal based on the holding data, and a control circuit which controls an output of the clock signal based on the selector signal. The selector receives the third output signal via a second input terminal, and outputs the first output signal or the third output signal as the second output signal.

16 Claims, 8 Drawing Sheets

U.S. PATENT DOCUMENTS

| | | |
|---|---|---|
| 7,315,159 B2 | 1/2008 | Nagai |
| 7,499,770 B2 * | 3/2009 | Sawada ........................ 700/304 |
| 7,609,042 B2 * | 10/2009 | Kokubun et al. .............. 323/284 |
| 7,777,470 B2 * | 8/2010 | Lindeberg et al. ............ 323/283 |
| 2005/0185737 A1 * | 8/2005 | Yamauchi ..................... 375/316 |
| 2008/0297128 A1 * | 12/2008 | Xu et al. ....................... 323/282 |

* cited by examiner

POWER CONTROLLER FOR SUPPLYING POWER VOLTAGE TO FUNCTIONAL BLOCK

INCORPORATION BY REFERENCE

The present application is a Continuation application of U.S. patent application Ser. No. 12/458,140, filed on Jul. 1, 2009, now U.S. Pat. No. 8,148,965 which is based on Japanese patent application No. 2008-176061, filed on Jul. 4, 2008, the entire contents of which is incorporated herein by reference.

BACKGROUND OF THE INVENTION

1. Field of the Invention

The present invention relates to the field of power controllers, and particularly to a digital control type power controller for a switching power supply.

2. Description of Related Art

The recent spread of cellular phones has been increasing a demand for lower over consumption of application processors included in cellular phones. To fulfill such demand for lower power consumption, required is a high-precision power control circuit capable of high-speed start-up and of suppressing variation in output voltage. To implement PID (Proportional-Integral-Derivative) control or highly-accurate follow-up control of variation in such a highly-precise power control circuit, a complex arithmetic expression is required, and thereby the number of operation times is increased.

Such being the case, the demand is difficult to fulfill by using an analog circuit; hence, to fulfill the demand, the use of a digital circuit is needed. However, operations by the digital circuit increase power consumption, and consequently shorten the battery life of the cellular phone or the like.

FIG. 9 is a diagram showing an example of a configuration of a power controller of a related art. Referring to FIG. 9, a power controller 201 includes: a switching transistor 2 which receives input voltage 1 supplied to the power controller 201; an inductor 3 connected, at one end, to an output of the switching transistor 2; a capacitor 4 connected between the other end of the inductor 3 and the ground; a power control circuit 70 which receives output voltage 13 and controls the output voltage 13 so that the output voltage 13 would be equal to a target value, the output voltage 13 obtained by smoothing output voltage from the switching transistor 2 by the inductor 3 and the capacitor 4; and a switching transistor driver 12 which performs on/off control on the switching transistor 2 upon receipt of a PWM signal 11 outputted from the power control circuit 70.

The power control circuit 70 includes: an A/D (analog/digital) converter 6 which samples the output voltage 13 (analog voltage) and converts the output voltage 13 into a digital signal; an arithmetic circuit (subtracter) 8 which calculates the difference between a voltage reference (digital value) 7, setting the target value of the output voltage 13, and the output signal of the A/D converter 6; a DSP (Digital Signal Processor) 20 constituting a PID controller which calculates by using, as an input, difference voltage (digital value) 42 outputted from the arithmetic circuit 8, on the basis of three controls, proportional control (P), integral control (I) and derivative control (D); a PWM (Pulse Width Modulation) generation circuit 10 which generates a switching pulse (PWM signal) 11 on the basis of the calculation result obtained by the DSP 20. The PWM signal 11 is inputted to the switching transistor driver 12.

In the power control circuit used in the power controller 201 in FIG. 9, a power switching controller is implemented as a digital signal processing system using digital PWM, the system including the A/D converter 6 and the DSP 20.

The on/off control is performed on the switching transistor 2 by converting the output voltage 13 (or output current) into a digital signal by the A/D converter 6, performing feedback, making comparison with the voltage reference value (digital value) 7, executing an algorithm to cancel the difference at the DSP 20, and then outputting the PWM signal 11.

Although an analog power supply generates the PWM signal 11 in an analog manner by using a comparator and a sawtooth wave (triangular wave), a digital power supply generates the PWM signal 11 in a digital manner as shown in FIG. 9.

If the digital value obtained by A/D conversion of the output voltage 13 is larger than the voltage reference (digital value) 7, then control is performed to turn off the switching transistor 2, while, if the digital value is smaller than the voltage reference 7, then control is performed to turn on the switching transistor 2. In this manner, the output voltage 13 is controlled to be constant and is then supplied.

For example, as a digital type power control, Patent Document 1 discloses a configuration including: an A/D converter which performs A/D conversion on output voltage from a power line; and a voltage monitoring circuit which generates a control signal on the basis of a result of comparison between an output of the A/D converter and a value of a control register (holding a value corresponding to an operation mode), supplies the control signal to a step-down circuit, and adjusts the output voltage to an optimal output voltage. In addition, as a digital type power control circuit, the descriptions of Non-patent Document 1 and the like can also be used as references.

[Patent Document 1] Japanese Patent Application Publication No. 2003-284322

[Non-patent Document 1] Keigo Kimura, Ibuki Mori, Yoshihisa Yamada, Haruo Kobayashi, Yasunori Kobori, Kazuya Shimizu, Masashi Kono, Hao San "High-Resolution DPWM Generator for Digitally Controlled DC-DC Converters," The 20th Workshop on Circuits and Systems in Karuizawa, Apr. 23-24, 2007, Citation: pp. 551-552 and FIG. 1

SUMMARY

The following is an analysis of a related technique of the present invention.

In the power controller 201 in FIG. 9, in order to keep the output voltage 13 constant while the output voltage 13 is outputted, the on/off control of the switching transistor 2 needs to be continuously performed in such a manner that the DSP 20 would perform control to compensate the difference between the digital value obtained by A/D conversion of the output voltage 13 and the voltage reference (digital value) 7, thereby outputting the PWM signal 11. Accordingly, power consumption increases, in other words, low power consumption is difficult to achieve.

The invention disclosed in the present application broadly has the following configuration.

A power controller includes, a digital control circuit unit which performs digital control on the basis of information on a difference between output voltage, supplied to a power control target device, and voltage reference so that the output voltage is equal to the voltage reference, and a processor control circuit which starts a processor in the digital control circuit unit to operate, in response to a change of a control signal, supplied by the power control target device and indicating a state of load in the power control target device, monitors an output from the digital control circuit unit, and stops the operation of the processor in the digital control circuit unit when the load in the power control target device is judged to have no change.

According to the present invention, variation in output voltage occurring due to variation in load in a power control target is suppressed by setting a control signal in the active state and then inputting the control signal to a power control circuit before load of a functional block in the power control target actually changes, while a processor operation clock is stopped when the load in the power control target does not change. In this way, low power consumption is achieved.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Figure 1:
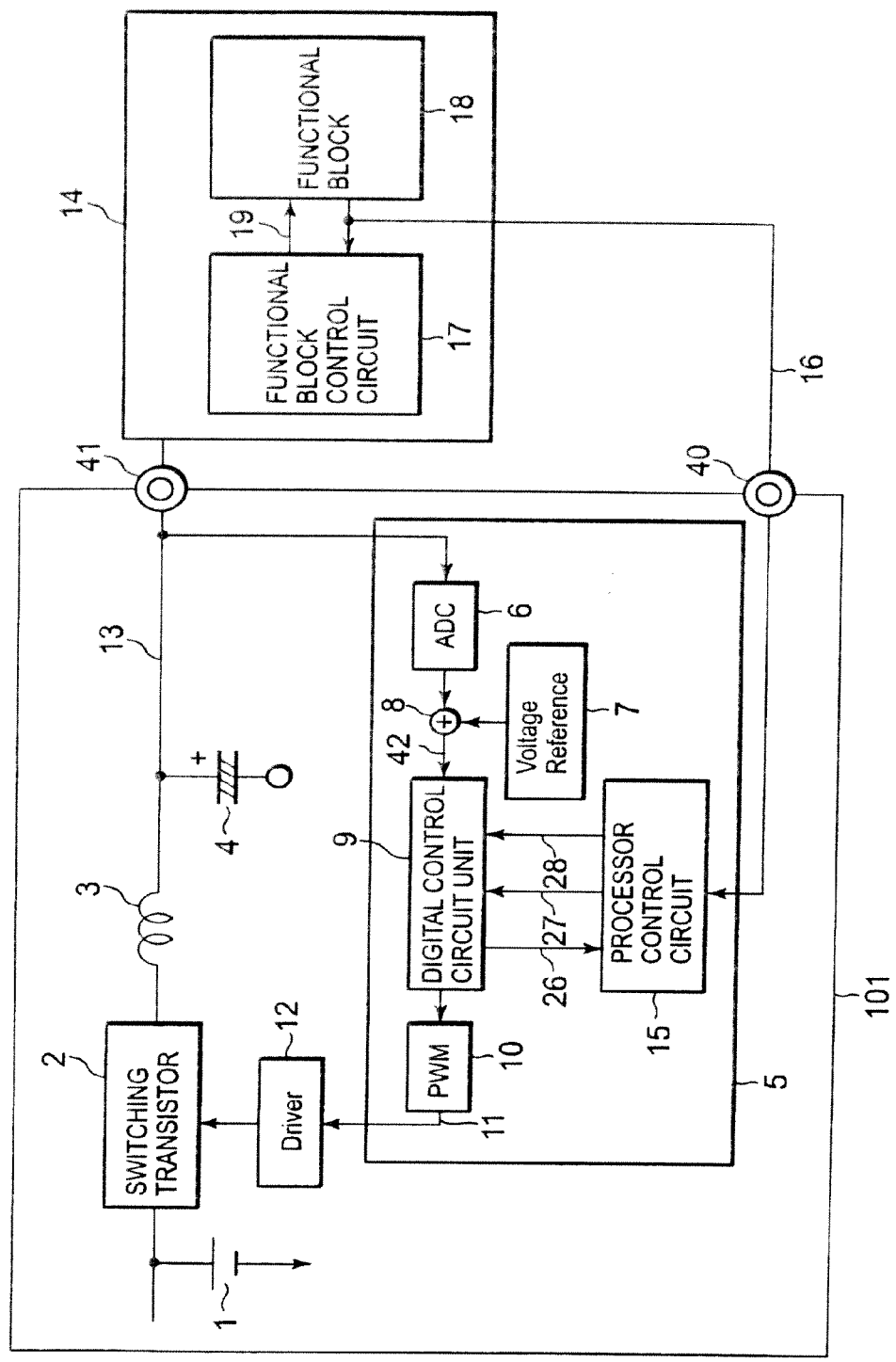
FIG. 1 is a diagram showing a configuration of a first example of the present invention.

Referring to FIG. 1, in an aspect of the present invention, a power control circuit (5) includes: a digital control circuit unit (9) which generates a control data piece for controlling on/off duty of a switching transistor (2), on the basis of information (digital value) on the difference between a value obtained by A/D conversion of output voltage (13) to be supplied to a power control target device (14) and the value of a predetermined voltage reference (7) so that the output voltage (13) would be equal to the voltage reference (7), the switching transistor (2) receiving input voltage (1); and a processor control circuit (15) which operates a processor included in the digital control circuit unit (9) in response to a change of a control signal (16) supplied by the power control target device (14) and indicating the state of a load in the power control target device (14), monitors an output (26) of the digital control circuit unit (9), and performs control for stopping the operation of the processor in the digital control circuit unit (9) when it is judged that the load in the power control target device (14) does not change.

In an aspect of the present invention, when the difference between at least two control data pieces different in time among the control data pieces (26) outputted from the digital control circuit unit (9) during the operation is within a predetermined range, the processor control circuit (15) judges the state as that where the load of the power control target device (14) does not change, and then stops supplying an operation clock (28) to the processor in the digital control circuit unit (9).

In an aspect of the present invention, while the operation of the processor of the digital control circuit unit (9) is stopped, the digital control circuit unit (9) holds and outputs the control data piece calculated by the processor in the digital control circuit unit (9) immediately before the stop.

In an aspect of the present invention, the power control circuit (5) includes: an A/D converter (6) which samples the output voltage (13) and converts the output voltage (13) into a digital signal; an arithmetic circuit (8) which calculates the difference between the digital value (7) of the voltage reference setting a target value of the output voltage (13) and an output value of the A/D converter (6); and a PWM generation circuit (10) which generates a PWM (Pulse Width Modulation) signal (11) to be supplied to the switching transistor (2), upon receipt of the control data piece from the digital control circuit unit (9). In response to a change of a control signal (16) from the power control target device (14), the processor control circuit (15) supplies the operation clock (28) to the processor in the digital control circuit unit (9).

Figure 2:
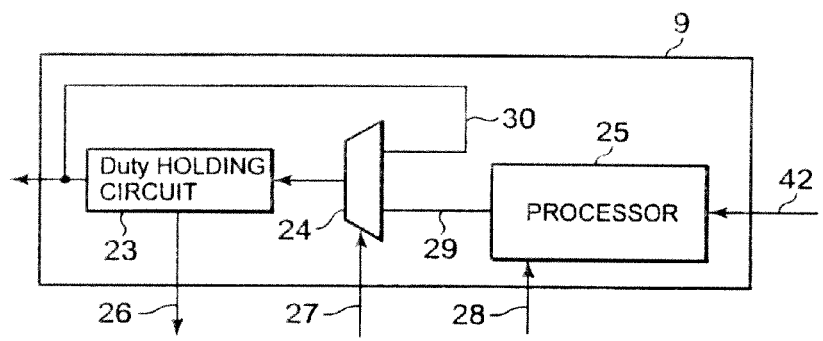
FIG. 2 is a diagram showing a configuration of a digital control circuit unit of the first example of the present invention.

Referring to FIG. 2, in an aspect of the present invention, the digital control circuit unit (9) includes: a processor (25) which outputs a control data piece for duty control upon receipt of an output (42) from the arithmetic circuit (8); a selector (24) which receives an arithmetic output (29) from the processor (25) as a first input; and a duty holding circuit (23) which holds an output from the selector (24). The selector (24) receives an output from the duty holding circuit (23) as a second input, and selects one of the first and the second inputs on the basis of a value of a selection signal (27) supplied by the processor control circuit (15). The output (control data piece for duty control) from the duty holding circuit (23) is inputted to the PWM generation circuit (10) and the processor control circuit (15).

Figure 3:
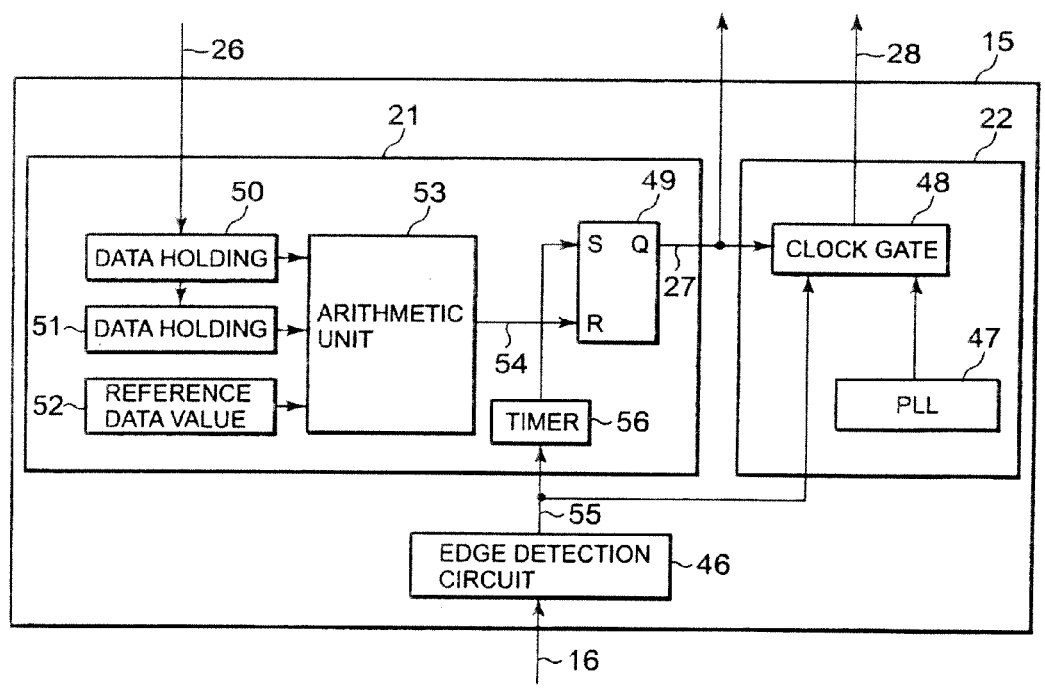
FIG. 3 is a diagram showing a configuration of a processor control circuit of the first example of the present invention.

Referring to FIG. 3, in an aspect of the present invention, the processor control circuit (15) includes: duty holding circuits (50, 51) which respectively hold a control data piece for duty control outputted from the duty holding circuit (23) of the digital control circuit unit (9) the last time and a control data piece for duty control outputted this time; an arithmetic unit (53) which judges whether the difference between the data pieces held by the data holding circuits (50, 51) is not more than a predetermined reference value, and outputs a reset signal when the difference is not more than the predetermined reference value; an edge detection circuit (46) which detects a change of the control signal (16) from the power control target device (14), and then generates a set signal (55) synchronized with the edge of the change; a set/reset type flip-flop (49) which is set by a signal obtained by delaying the set signal (55) outputted from the edge detection circuit (46) while being reset by a reset signal outputted from the arithmetic unit (53), and outputs an output signal as the selection signal (27); and a clock gate circuit (48) which performs gate control for outputting, upon receipt of the set signal (55) from the edge detection circuit (46) and the selection signal (27), a clock signal from a clock generation circuit (47), from when the set signal (55) is activated, and for stopping the output of the clock signal from the clock generation circuit (47) when the selection signal is reset.

Figure 6:
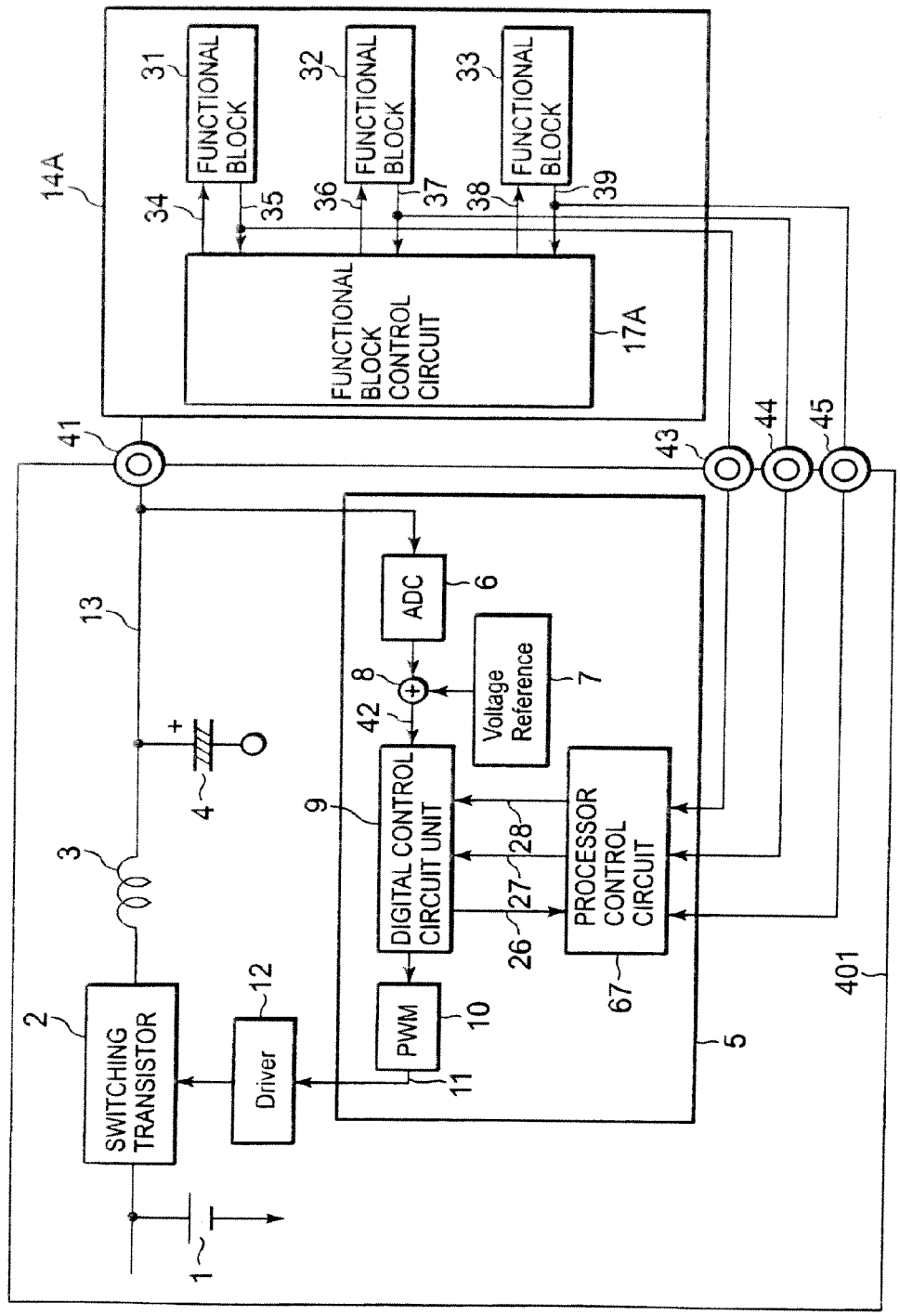
FIG. 6 is a diagram showing a configuration of a second example of the present invention.
Figure 7:
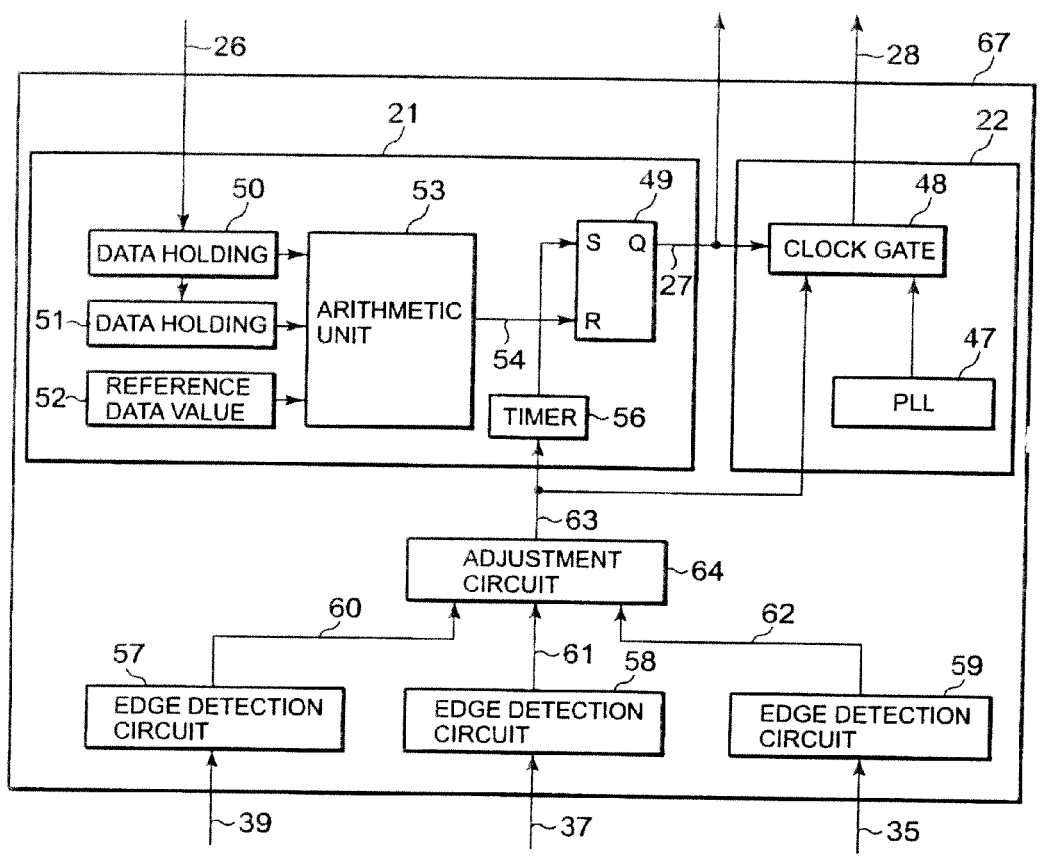
FIG. 7 is a diagram showing a configuration of a processor control circuit of the second example of the present invention.

Referring to FIG. 6 and FIG. 7, in another aspect of the present invention, a processor control circuit includes multiple edge detection circuits (59, 58, 57) which respectively receive inputs of control signals (35, 37, 39) from a power control target device (14A), and each detect a change of the control signal and then generates a detection signal synchronized with the edge of the change; and an adjustment circuit (64) which receives outputs from the multiple edge detection circuits (59, 58, 57), adjusts the outputs, and then outputs the outputs as one set signal (63). Here, the set/reset type flip-flop (49) is set by a signal obtained by delaying the set signal (63) outputted from adjustment circuit (64) while being reset by a reset signal outputted from the arithmetic unit (53), and outputs an output signal as the selection signal (27). In an aspect of the present invention, the power control target device (14) includes: one or multiple functional blocks (18 or 31, 32, 33); and functional block control circuit (17 or 17A) providing an operation clock (19 or 34, 36, 38) to the one or each of the multiple functional blocks. The one or each of the multiple functional blocks supplies a control signal (16 or 35, 37, 39) to the functional block control circuit (17 or 17A) and power controller (101 or 401).

According to the present invention, the functional block clock active signal (16) is set to be active (active state) before the load of the functional block in the power control target device (14) changes, and is then inputted to the power control circuit. Thus, variation in the output voltage (13) due to change of the load in the power control target device (14) is suppressed. Moreover, when the load of the power control target device (14) does not change, the processor operation clock (28) is stopped to stop the processor (25) of the digital control circuit unit (9). Thus, low power consumption is achieved. In the following, description will be given on the basis of examples.

Example 1

FIG. 1 is a diagram showing a configuration of a power controller according to a first example of the present invention. Referring to FIG. 1, a power controller 101 of the present example includes: a switching transistor 2 which receives input voltage 1 as an input; an inductor 3 which is connected, at one end, to an output of the switching transistor 2; a capacitor 4 which is connected between the other end of the inductor 3 and the ground; a voltage output terminal 41 which outputs output voltage 13 corresponding to voltage obtained by smoothing an output of the switching transistor 2 by the inductor 3 and the capacitor 4; a power control circuit 5 which controls the output voltage 13; a switching transistor driver 12 which switches on and off the switching transistor 2; and a control input terminal 40 which receives a control signal 16 for controlling the power control circuit 5. The control signal 16 inputted to the control input terminal 40 is also referred to as a "functional block clock active signal" in this specification.

The power control circuit 5 includes: an A/D converter (ADC) 6 which samples the output voltage 13; an arithmetic circuit 8 which calculates the difference between a voltage reference (Voltage Reference) 7 (digital value), setting a target value of the output voltage 13, and an output (digital value) of the A/D converter 6; a digital control circuit unit 9 which receives an output difference voltage 42 from the arithmetic circuit 8 as an input; a processor control circuit 15 which receives the functional block clock active signal 16 inputted to the control input terminal 40, and controls the digital control circuit unit 9; a PWM generation circuit 10 which generates a switching pulse on the basis of an output from the digital control circuit unit 9, and then supplies the switching pulse to the switching transistor driver 12 as a PWM signal 11.

The processor control circuit 15 supplies a selection signal 27 and a processor operation clock 28 to the digital control circuit unit 9.

The digital control circuit unit 9 supplies a Duty (duty) holding data piece 26 to the processor control circuit 15.

A power control target device (also referred to simply as a "power control target") 14, to which power voltage outputted from the voltage output terminal 41 is supplied, includes: a functional block 18; and a functional block control circuit 17 which controls an operation clock of the functional block 18.

The functional block control circuit 17 supplies a clock signal 19 to the functional block 18. The clock signal 19 from the functional block control circuit 17 is also referred to as a "functional block operation clock signal" in this specification.

The functional block 18 supplies the functional block clock active signal 16 to the functional block control circuit 17, and also supplies the functional block clock active signal 16 to the control input terminal 40 of the power controller 101.

FIG. 2 is a diagram showing an example of a configuration of the digital control circuit unit 9 in FIG. 1. Referring to FIG. 2, the digital control circuit unit 9 includes: a processor 25 which executes a control algorithm by using the difference (digital signal) 42 from the arithmetic circuit 8 in FIG. 1 as an input, the control algorithm being, for example, PID control for controlling the output voltage 13 on the basis of the three elements, proportion, integral and deviation; a selector 24 which inputs, to a first input terminal, an output 29 obtained from difference compensation calculation performed by the processor 25; and a Duty (duty) holding circuit 23 which holds a control data piece for the active signal width of a PWM signal.

The output 29 from the processor 25 is a control data piece of the active signal width (duty) of a PWM signal 11 (control data for duty control).

The Duty holding data piece 26, which is an output from the Duty holding circuit 23, is inputted to a second input terminal of the selector 24.

The selector 24 selects one of the data pieces on the basis of the inputted selection signal 27, and then outputs the data piece. The output from the selector 24 is inputted to the Duty holding circuit 23.

The digital control circuit unit 9 is supplied with the clock signal (processor operation clock signal) 28 by the processor control circuit 15.

FIG. 3 is a diagram showing a configuration of the processor control circuit 15 in FIG. 1. Referring to FIG. 3, the processor control circuit 15 includes a Duty stability judgment circuit 21, a processor clock control circuit 22 and an edge detection circuit 46.

The duty holding data piece 26, which is an output from the Duty holding circuit 23 in FIG. 2, and a set signal 55 from the edge detection circuit 46 are inputted to the Duty stability judgment circuit 21, and the Duty stability judgment circuit 21 outputs the selection signal 27.

The Duty stability judgment circuit 21 includes: a data holding circuit 50 which holds the Duty holding data piece 26; a data holding circuit 51 which holds the data piece of the data holding circuit 50; a reference data value 52 which is a threshold for a comparison between the Duty holding data piece 26 of the previous cycle and the Duty holding data piece 26 of the current cycle; an arithmetic unit 53 which calculates the difference between the value in the data holding circuit 50 and the value in the data holding circuit 51, and then compares the difference with the reference data value 52; a set/reset type flip-flop (SR flip-flop) 49; and a timer 56 which delays and then outputs the set signal 55. The SR flip-flop 49 inputs, to a reset terminal R, an output from the arithmetic unit 53 as a reset signal 54 while inputting, to a set terminal S, an output from the timer 56 as a set signal, and then outputs the selection signal 27.

The functional block clock active signal 16 is inputted to the edge detection circuit 46, and the edge detection circuit 46 outputs the set signal 55.

The processor clock control circuit 22 includes: a PLL (Phase Locked Loop) 47 which supplies a clock signal for the processor 25 in FIG. 2; and a clock gate 48 which controls an output from the PLL 47 by using the set signal 55 and the selection signal 27.

The clock gate 48 receives inputs of the selection signal 27, the set signal 55 and the output from the PLL 47, and then outputs the output from the PLL 47 as the processor operation clock 28. The clock gate 48 stops the processor operation clock 28 when the selection signal 27 is inactive (inactive state). The clock gate 48 has a circuit configuration of opening a gate at the timing of the rising edge of the set signal 55 and then outputting the clock 28, while closing the gate at the timing of the falling edge of the selection signal 27, in this example, although not limited thereto.

Figure 4:
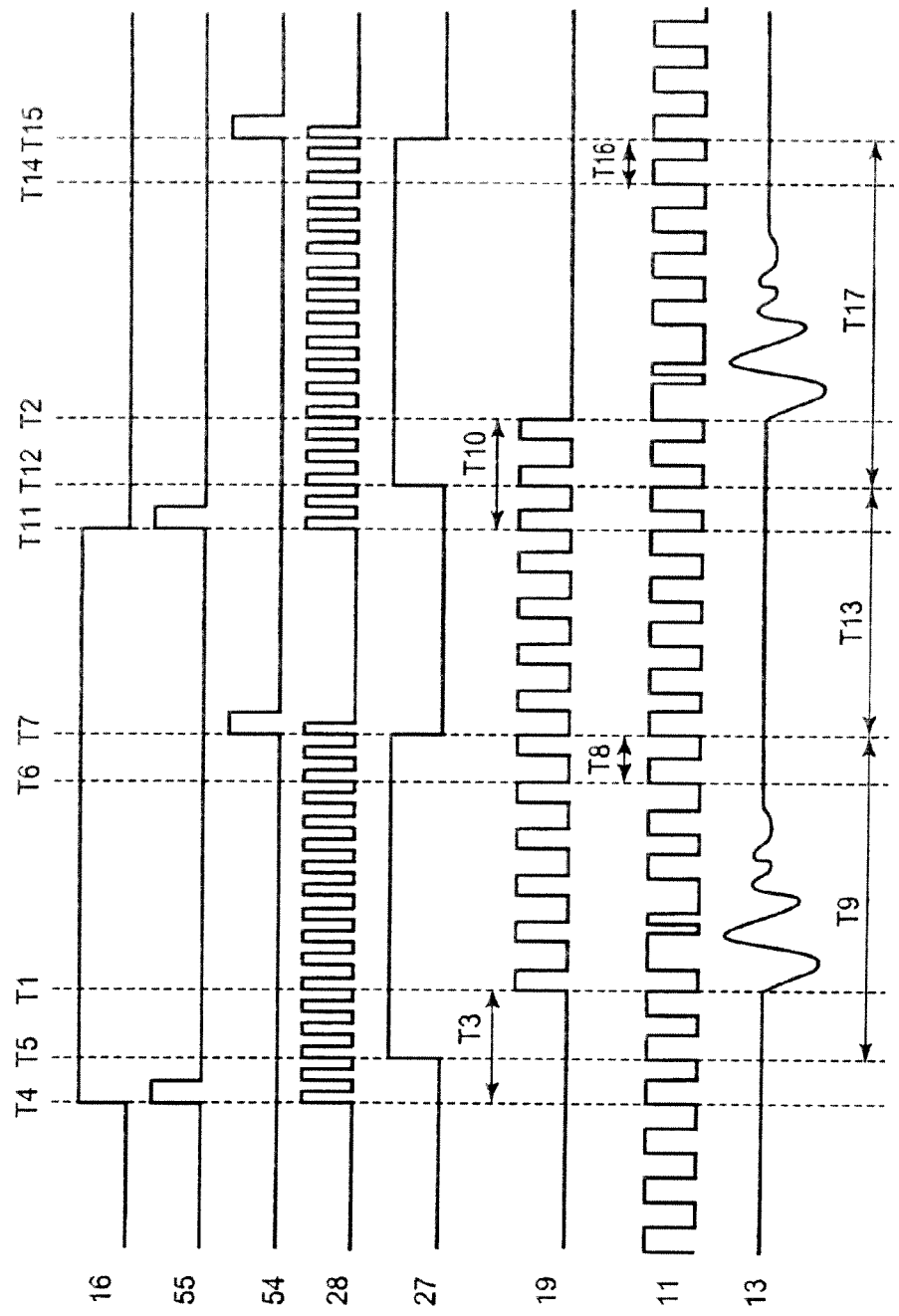
FIG. 4 is a timing chart showing an example of operations in the first example of the present invention.

FIG. 4 is a timing chart showing an example of operations of the first example of the present invention. The operations of the first example shown in FIG. 1 to FIG. 3 will be described with reference to FIG. 4.

In FIG. 4, at Timing T4, the functional block clock active signal 16 rises to High level.

The edge detection circuit 46 detects the rising edge of the functional block clock active signal 16, and then generates the set signal 55 of a one-shot pulse.

The set signal 55 is supplied to the clock gate 48, and the clock gate 48 supplies, to the processor 25 in FIG. 2, the output signal from the PLL 47 as the processor operation clock signal 28. Upon receipt of the processor operation clock signal 28, the processor 25 is started and starts calculating the difference between the voltage reference 7 and the output from the A/D converter 6.

The timer 56, having received the set signal 55, delays the set signal 55 by an amount until completion of start-up preparation of the processor 25, and then sets the SR flip-flop 49 at Timing T5. At Timing T5, the selection signal 27, which is an output from the SR flip-flop 49, rises to High level, and the selector 24 in FIG. 2 selects the output 29 from the processor 25.

An output 30 from the Duty holding circuit 23 in FIG. 2 is updated with a result of difference compensation calculation by the processor 25. At Timing T1, which is Time Period T3 after riming T4, the Time Period T3 required for the calculation by the processor 25, the functional block operation clock signal 19 in the power control target 14 becomes active, load of the power control target 14 increases, and variation occurs in the output voltage 13.

To suppress the variation in the output voltage 13, the processor 25 having already been operating inputs, to the Duty holding circuit 23, the output 29, which is the result of the compensation calculation for the difference between the voltage reference 7 and the output from the A/D converter 6 by the processor 25, and the Duty holding circuit 23 inputs the updated signal (Duty holding circuit output signal) 30 to the PWM generation circuit 10 every time the difference compensation calculation is performed by the processor 25.

The PWM generation circuit 10 performs on/off control on the switching transistor 2 by using the PWM signal 11.

The Duty holding circuit output signal 30 generated on the basis of the difference compensation calculation by the processor 25 is held by the Duty holding circuit 23 during Time Period T9 in which the selection signal 27 is active. The duty holding data piece 26 is outputted to the Duty stability judgment circuit 21, and is updated every time difference compensation calculation is performed by the processor 25.

The data holding circuit 51 holds the Duty holding data piece 26 of the preceding cycle, while the data holding circuit 50 holds the Duty holding data piece 26 of the current cycle.

The arithmetic unit 53 calculates the difference between the data pieces held by the data holding circuit 50 and the data holding circuit 51, sets the reset signal 54 to be active at Timing T7 when the calculation value becomes not more than the reference data value 52 while setting the selection signal 27 to be inactive (inactive).

When the selection signal 27 is inactive, the selector 24 in FIG. 2 selects the Duty holding circuit output signal 30, and then the Duty holding circuit output signal 30 in Time Period T8 between Timing T6 to Timing T7 when the last update is performed is outputted to the PWM generation circuit 10. When the difference between the data holding circuit 51, holding the Duty holding data piece 26 of the preceding cycle, and the data holding circuit 50, holding the Duty holding data piece 26 of the current cycle, is not more than the reference data value 52, the Duty holding circuit 23 continues to output the Duty holding circuit output signal 30 obtained in Time Period T8 in which the last update is performed.

After Timing T7 at which the selector 24 makes switching such that the duty holding circuit output signal 30 would be selected, the Duty stability judgment circuit 21 lowers the selection signal 27 in the Duty stability judgment circuit 21 because no calculation by the processor 25 is required any more, and the clock gate 48 sets the processor operation clock 28 to be inactive (fixed to Low, for example).

Next, at Timing T11, the power controller 101 lowers the functional block clock active signal 16, and the edge detection circuit 46 thereby generates the set signal 55.

The set signal 55 controls the clock gate 48, and an output from the PLL 47 is outputted to the processor operation clock 28 and is then supplied to the processor 25. Upon receipt of the processor operation clock 28, the processor 25 starts to operate and to perform compensation calculation of the difference between the voltage reference 7 and the output from the A/D converter 6.

The timer 56 generates a delay corresponding to the amount until the start-up preparation of the processor 25 is completed, and delays the set signal 55 accordingly. Thereby, at Timing T12, the set/reset type flip-flop 49 is set. The output selection signal 27 from the set/reset type flip-flop 49 becomes active, and the selector 24 selects the processor output 29. The Duty holding circuit output signal 30 is updated with the result of the difference compensation calculation by the processor 25.

At Timing T2, which is Time Period T10 after Timing T11, the Time Period T10 required for the calculation by the processor 25, the functional block operation clock signal 19 in the power control target device 14 becomes active, the load of the power control target 14 increases, and variation occurs in the output voltage 13.

To suppress the variation in the output voltage 13, the processor 25 already in operation inputs, to the Duty holding circuit 23, the processor output 29, which is the result of the compensation calculation of the difference between the voltage reference 7 and the output from the A/D converter 6 sampling the output voltage 13.

Every time the difference compensation calculation is performed by the processor 25, the Duty holding circuit 23 inputs, to the PWM generation circuit 10, the updated Duty holding circuit output signal 30, and on/off control is performed on the switching transistor 2 by using the PWM signal 11.

The Duty holding circuit output signal 30 generated on the basis of the difference compensation calculation by the processor 25 is held by the Duty holding circuit 23 during Time Period T17 in which the selection signal 27 is active. The Duty holding data piece 26 is outputted to the Duty stability judgment circuit 21, and the Duty holding data piece 26 is updated by the processor 25 every time the difference compensation calculation is performed.

The data holding circuit 51 holds the Duty holding data piece 26 of the preceding cycle, while the data holding circuit 50 holds the Duty holding data piece 26 of the current cycle.

The arithmetic unit 53 calculates the difference between the data holding circuit 50 and the data holding circuit 51, and sets the reset signal 54 to be active (active state) while setting the selection signal 27 to be inactive (inactive state), at Timing T15 at which the calculation value becomes not more than the reference data value 52.

The Duty holding circuit output signal 30 is selected by the selector 24, and the Duty holding circuit output signal 30 of Time Period 16 between Timing T14 and Timing T15, in which the last update was made, is outputted to the PWM generation circuit 10.

While the difference between the data holding circuit 51, holding the Duty holding data piece 26 of the preceding cycle, and the data holding circuit 50, holding the Duty holding data piece 26 of the current cycle, is not more than the reference data value 52, the Duty holding circuit 23 continues to output the Duty holding circuit output signal 30 of Time Period T16, in which the last update was made. After Timing T15, at which the switching is made so that the selector 24 would select the Duty holding circuit output signal 30, the Duty stability judgment circuit 21 lowers the selection signal 27 because calculation by the processor 25 is no more required, and the clock gate 48 sets the processor operation clock 28 to be inactive.

Figure 5:
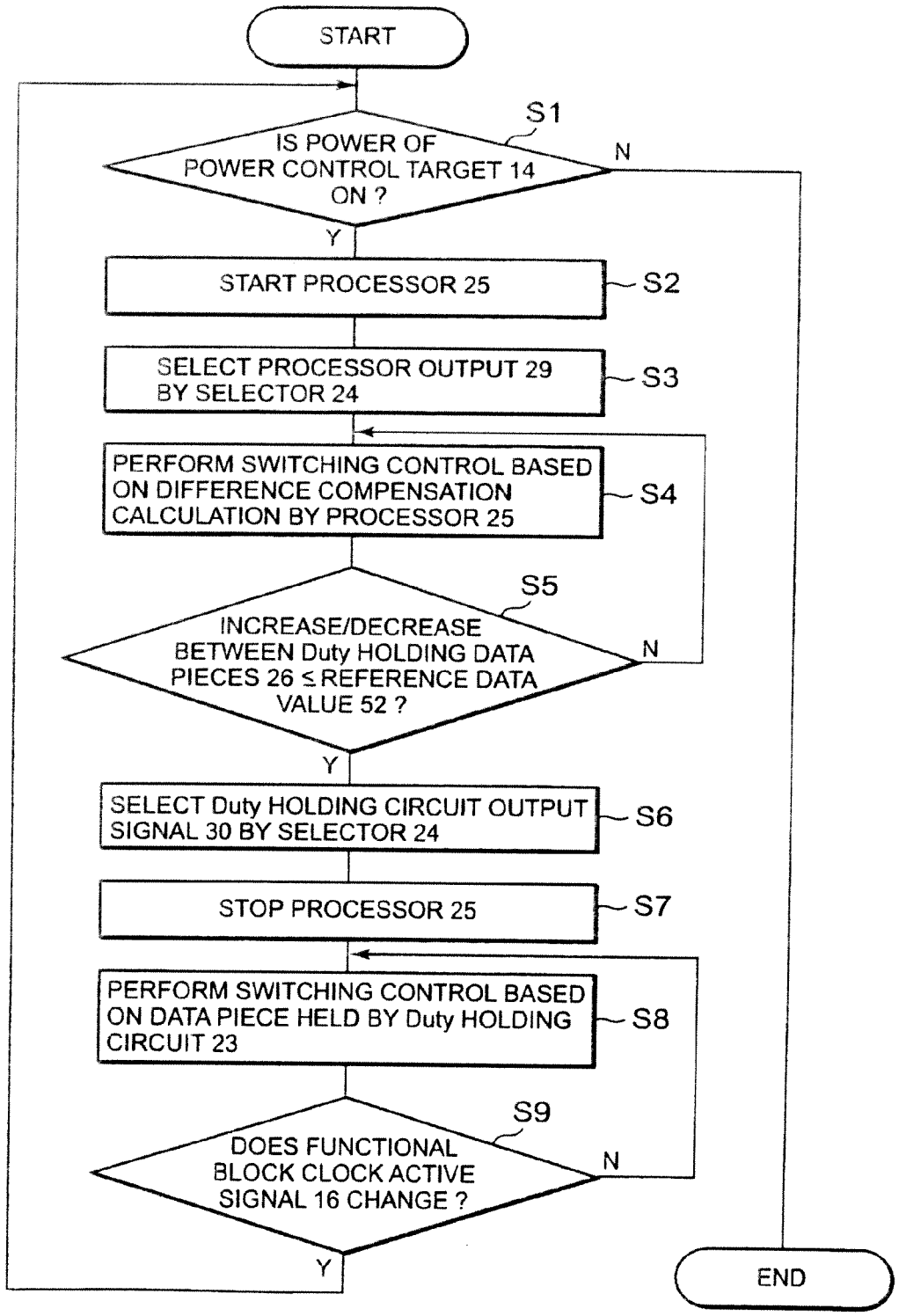
FIG. 5 is a flowchart showing operations in the first example of the present invention.

FIG. 5 is a flowchart showing operations of the power control circuit of this example. First, the power controller 101 judges whether or not the power of the power control target 14 is in the ON state. The processing advances to Step S2 if the power controller 101 is in the ON state, while being terminated if the power controller 101 is in the OFF state (Step S1).

The clock gate 48 supplies the processor operation clock 28 to the processor 25 to start the processor 25 (Step S2).

The selector 24 selects the processor output 29, which is an output from the processor 25, on the basis of the selection signal 27 (Step S3).

Switching control based on the difference compensation calculation by the processor 25 is performed (Step S4). Specifically, the processor 25 performs compensation calculation of the difference between the voltage reference 7 and the output from the A/D converter 6 sampling the output voltage 13. The selector 24 receives inputs of the processor output 29 and the Duty holding circuit output signal 30, and an output from the selector 24 is inputted to the Duty holding circuit 23 thereby holding the data and is at the same time inputted to the PWM generation circuit 10 as the Duty holding circuit output signal 30. The digital control circuit unit 9 sets the Duty holding circuit output signal 30 to be variable, to perform on/off control on the switching transistor 2.

The processing advances to Step S4 if the result of the calculation between the value of the duty holding data piece 26 of the preceding cycle and the Duty holding data piece 26 of the current cycle by the arithmetic unit 53 in the Duty stability judgment circuit 21 is larger than the reference data value 52, while advancing to Step S6 if the result is not more than the reference data value 52 (Step S5).

The selector 24 selects the Duty holding circuit output signal 30 on the basis of the selection signal 27 (Step S6).

The clock gate 48 stops supplying the processor operation clock 28 to the processor 25, and thereby stops the operation of the processor 25 (Step S7).

The Duty holding circuit 23 inputs the Duty holding circuit output signal 30 held therein, to the PWM generation circuit 10, and thereby performs on/off control on the switching transistor 2 (Step S8).

The edge detection circuit 46 detects whether or not any change has occurred in the functional block clock active signal 16. The processing advances to Step S1 if the functional block clock active signal 16 has changed from inactive to active or from active to inactive, while advancing to Step S8 if no change has occurred (Step S9).

As described above, in this example, the selection signal 27 is set to be active only in Time Period T9 and Time Period T17, in which variation occurs in the output voltage 13, thereby performing PWM control by using the processor output 29, which is an output from the processor 25. In Time Period T13, in which the output voltage 13 is stable, the arithmetic unit 53 resets the SR flip-flop 49, thereby setting the selection signal 27 to be inactive and turning off the clock gate 48 to stop the operation of the processor 25.

At Timing T4, the functional block 18 raises the functional block clock active signal 16, indicating that the functional block operation clock signal 19 from the functional block control circuit 17 is in the active state. The clock gate 48 sets the processor operation clock 28 from the PLL 47 to be active, and thereby starts the processor 25.

At Timing T1, which is Time Period T3 after Timing T4, the Time Period T3 required for the calculation by the processor 25, the functional block operation clock signal 19 in the power control target 14 becomes active, the load of the power control target 14 increases, and variation occurs in the output voltage 13.

At Timing T1, the processor output 29, calculated by the processor 25, is inputted to the Duty holding circuit 23. Then, every time the difference compensation calculation by the processor 25 is performed, the Duty holding circuit 23 inputs, to the PWM generation circuit 10, the Duty holding circuit output signal 30 updated by the processor 25 and thereby performs on/off control on the switching transistor 2 by using the PWM signal 11.

Similarly, at Timing T11, the functional block clock active signal 16, indicating that the functional block operation clock signal 19 is in the active state, is lowered, and the processor operation clock 28 is set to be active, thereby starting the processor 25.

At Timing T2, which is Time Period T10 after Timing T11, the Time Period T10 required for the calculation by the processor 25, the functional block operation clock signal 19 in the power control target 14 becomes inactive, the load of the power control target 14 decreases, and variation occurs in the power voltage 13.

At Timing T2, the processor output 29, calculated by the processor 25, is inputted to the Duty holding circuit 23. Then, every time the difference compensation calculation by the processor 25 is performed, the Duty holding circuit 23 inputs the updated Duty holding circuit output signal 30 to the PWM generation circuit 10, thereby performing on/off control on the switching transistor 2 by using the PWM signal 11.

Example 2

FIG. 6 is a diagram showing a configuration of a power controller of a second example of the present invention. In FIG. 6, the same components as those in FIG. 1 are denoted by the same reference numerals. Referring to FIG. 6, the power controller 401 includes: the switching transistor 2; the inductor 3; the capacitor 4; the voltage output terminal 41 which outputs the output voltage 13; the power control circuit 5; the switching transistor driver 12; and control input terminals 43, 44 and 45 which respectively receive inputs of functional block clock active signals 35, 37 and 39 for controlling the power control circuit 5.

The power control circuit 5 includes: the A/D converter 6 which receives the output voltage 13; the arithmetic circuit 8 which performs calculation of the difference between an output from the A/D converter 6 and the voltage reference 7; the digital control circuit unit 9; a processor control circuit 67 which controls the digital control circuit unit 9; and the PWM generation circuit 10.

The processor control circuit 67 receives the functional block clock active signals 35, 37 and 39 from the control input terminals 43, 44 and 45 respectively, and then outputs the selection signal 27 and the processor operation clock 28.

A power control target device 14A includes a functional block control circuit 17A and multiple functional blocks 31, 32 and 33. The functional block control circuit 17A provides the functional block operation clock signals 34, 36 and 38 respectively to the functional block 31, 32 and 33.

The functional block 31, 32 and 33 respectively output the functional block clock active signals 35, 37 and 39 to the functional block control circuit 17A, and supply the functional block clock active signals 35, 37 and 39 respectively to the control input terminals 43, 44 and 45 of the power controller 401.

FIG. 7 is a diagram showing a configuration of the processor control circuit 67 of Example 2 of the present invention. The processor control circuit 67 includes: the Duty stability judgment circuit 21; the processor clock control circuit 22; the Duty holding data piece 26; edge detection circuits 59, 58 and 57 which respectively receive inputs of the functional block clock active signals 35, 37 and 39; and an adjustment circuit 64 which receives inputs of edge detection signals 62, 61 and 60 corresponding to outputs from the edge detection circuits 59, 58 and 57. An output signal 63 from the adjustment circuit 64 is inputted to the timer 56 and the clock gate 48 as a set signal.

The Duty stability judgment circuit 21 includes the data holding circuit 50, the data holding circuit 51, the reference data value 52, the arithmetic unit 53, the reset signal 54, the timer 56 which delays the set signal 63, and the set/reset type flip-flop 49.

The processor clock control circuit 22 includes the PLL 47 and the clock gate 48 which controls an output from the PLL 47 upon receipt of the set signal 63 and the selection signal 27.

Figure 8:
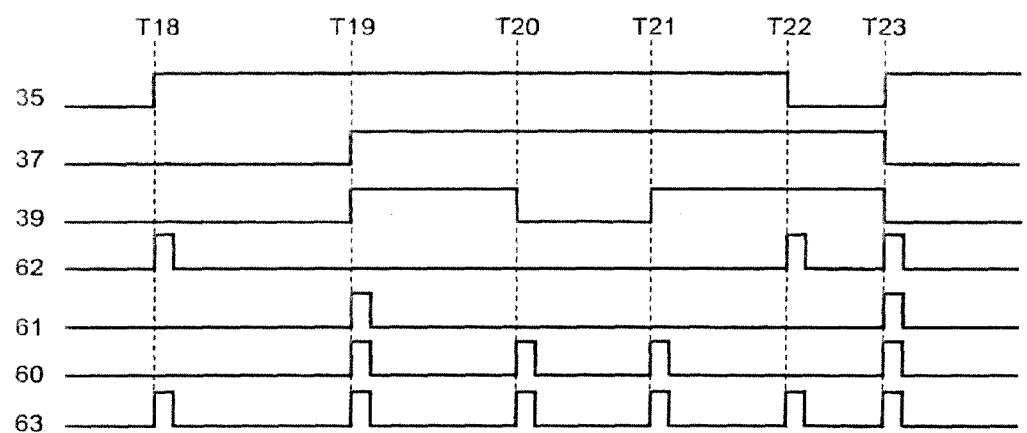
FIG. 8 is a timing chart showing an example of operations in the second example of the present invention.
Figure 9:
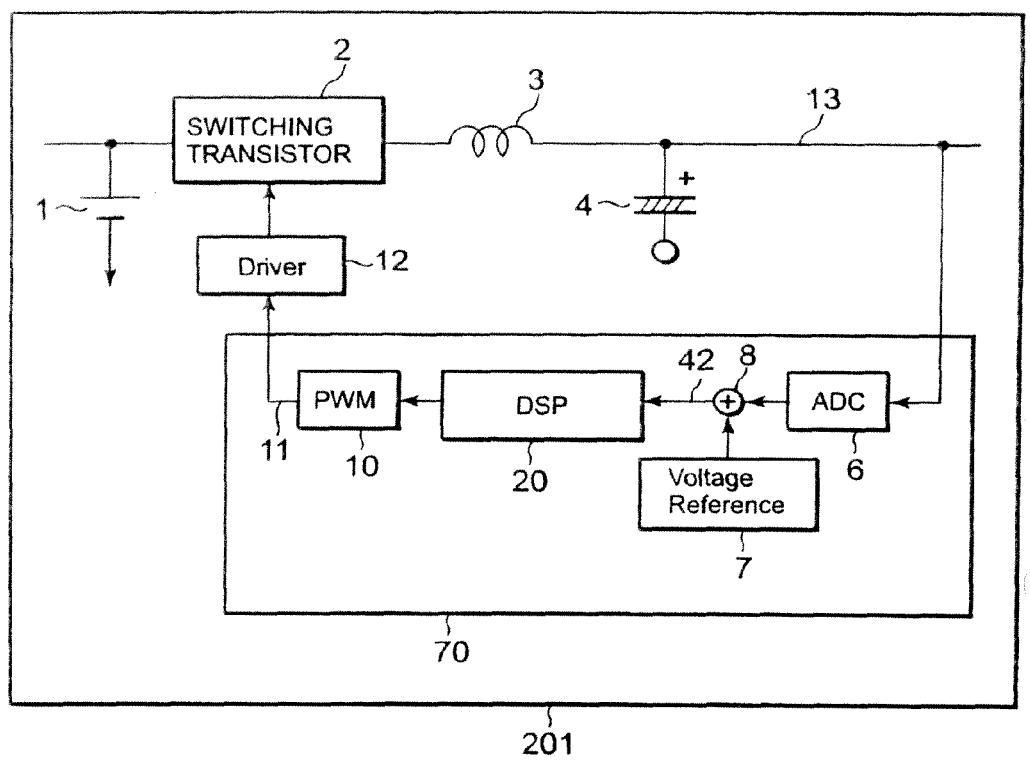
FIG. 9 is a diagram showing a configuration of a power controller of a related art.

FIG. 8 is a timing chart describing operations of the processor control circuit 67 of the second example of the present invention. The operations in the second example of the present invention will be described with reference to FIG. 8.

At Timing T18, the functional block operation clock signal 34 (see FIG. 6) becomes active, and the functional block clock active signal 35 rises.

At Timing T22, the functional block clock active signal 35 falls. At Timing T23, the functional block operation clock signal 34 becomes active, and the functional block clock active signal 35 rises.

The edge detection circuit 59 detects an edge at each of Timing T18 and Timing T23, at which the functional block clock active signal 35 rises, and Timing T22, at which the functional block clock active signal 35 falls, and then sets the edge detection signal 62 to be active (one-shot pulse).

At Timing T19, the functional block operation clock 36 (see FIG. 6) becomes active, and the functional block clock active signal 37 rises. At Timing T23, the functional block clock active signal 37 falls. The edge detection circuit 58 detects an edge at each of Timing 19, at which the functional block clock active signal 37 rises, and Timing T23, at which the functional block clock active signal 37 falls, and then sets the edge detection signal 61 to be active.

At Timing T19, the functional block operation clock signal 38 (see FIG. 6) becomes active, and the functional block clock active signal 39 rises. At Timing T20, the functional block clock active signal 39 falls. At Timing T21, the functional block operation clock signal 38 (see FIG. 6) becomes active, and the functional block clock active signal 39 rises. At Timing T23, the functional block clock active signal 39 falls. The edge detection circuit 57 detects an edge at each of Timing T19 and Timing T21, at which the functional block clock active signal 39 rises, and Timing T20 and Timing T23, at which the functional block clock active signal 39 falls, and then sets the edge detection signal 60 to be active.

The adjustment circuit 64 carries out the logical OR among the edge detection signal 62, the edge detection signal 61 and the edge detection signal 60, and then outputs the set signal 63. The adjustment circuit 64 may be configured by a 3-input OR circuit, for example. In this case, when any of the edge detection signal 62, the edge detection signal 61 and the edge detection signal 60 is changed to High level, the set signal 63 is set to be active. The set signal 63 controls the clock gate 48, thereby outputting an output from the PLL 47 to the processor operation clock 28.

The timer 56 generates a delay corresponding to the amount until the start-up preparation of the processor 25 is completed; and delays the set signal 63. An output from the timer 56 sets the set/reset type flip-flop 49, and the set/reset type flip-flop 49 outputs the selection signal 27 to the selector 24. The selector 24 selects the processor output 29.

As described above, the operation clock of any of the functional block 31, the functional block 32 and the functional block 33 is changed to be active or inactive by generating the set signal 63. Thereby, variation in the output voltage 13 due to variation occurred in the load can be controlled on the basis of the compensation calculation of the difference between the voltage reference 7 and the output from the A/D converter 6 by the processor 25.

When an application is operated for 2 hours twice a day, in a power system whose power is turned on for 24 hours and which is set in the standby state, in the technique of the related art, highly accurate power control by the digital control processor is performed for 24 hours all the time, including the time in the standby state.

In the above examples, the digital control processor operates twice each for two hours; thus, the operation time of the digital control processor is ⅙ (approximately 17%) of the case of the related art.

Assume that a concrete current consumption of the digital control processor is 12 mA. In the technique of the related art, current of 12 mA×24 hours=288 mAh is consumed.

In the examples, the current of 12 mA×4 hours=48 mAh is consumed by the operations of the digital control processor, and current of 2 mA×20 hours=40 mAh is consumed in the 20 hours in which control is performed by using Duty with low power (current consumption is approximately 1 to 2 mA). Hence, the effect of 88 mAh (current consumption reduced by approximately 70% compared with the case of the related art) is obtained.

Here, the disclosures of the above-given patent document and non-patent document are incorporated in this specification by reference. Changes and adjustments can be made to the exemplary embodiment and the examples within the entire disclosure (including the scope of the claims) of the present invention on the basis of the technical idea of the invention. Moreover, various combinations and selections among the various disclosed elements are possible within the scope of the claims of the present invention. In other words, the present invention obviously includes various alternations and modifications which can be made by those skilled in the art on the basis of the entire disclosure including the scope of the claims and the technical idea.

Further, it is noted that Applicant's intent is to encompass equivalents of all claim elements, even if amended later during prosecution.

What is claimed is:

1. A power controller, comprising:
    a processor which outputs a first output signal based on a first voltage in response to a clock signal;
    a selector which receives the first output signal via a first input terminal, and outputs a second output signal;
    a holding circuit which outputs a third output signal and holding data, based on the second output signal;
    a determination circuit which outputs a selector signal based on the holding data; and
    a control circuit which controls an output of the clock signal based on the selector signal, wherein
    the selector receives the third output signal via a second input terminal, and outputs the first output signal or the third output signal as the second output signal.

2. The power controller according to claim 1, wherein
    the processor initiates an operation of outputting the first output signal by receiving the clock signal from the control circuit, and deactivates the operation of outputting the first output signal by stopping the receipt of the clock signal.

3. The power controller according to claim 2, wherein:
    the clock signal is generated based on the first voltage by a power control target device being input with the first voltage.

4. The power controller according to claim 2, wherein
    the holding circuit outputs the holding data based on the clock signal, the second output signal, and the control data.

5. The power controller according to claim 2, further comprising:
    a switching transistor which outputs the first voltage, wherein
    the switching transistor changes the first voltage based on the holding data.

6. The power controller according to claim 1, wherein:
    the holding circuit outputs the holding data based on the clock signal, the second output signal, and the holding data.

7. The power controller according to claim 6, further comprising:
    a switching transistor which outputs the first voltage, wherein
    the switching transistor changes the first voltage based on the holding data.

8. The power controller according to claim 1, wherein:
    the control circuit operates the processor when a difference between the first voltage and a voltage of the third output signal is more than the predetermined value.

9. The power controller according to claim 1, wherein:
    the control circuit stops an operation of the processor when a difference between the first voltage and a voltage of the third output signal is less than a predetermined value.

10. The power controller according to claim 1, further comprising:
    a switching transistor which outputs the first voltage, wherein
    the switching transistor changes the first voltage based on the holding data.

11. A power controller, comprising:
    a processor control circuit that is configured to receive a control signal and output a clock signal based on a selector signal; and
    a digital control circuit that includes:
        a processor that is configured to be activated upon receipt of the clock signal and to output a first output signal based on a first voltage;
        a holding circuit which outputs a third output signal and holding data, based on a second output signal; and
        a selector that receives the first output signal and the third output signal, and outputs the second output signal as either the first output signal or the third output signal according to the selector signal, wherein
    the selector signal has a level that is based on the holding data.

12. The power controller according to claim 11, wherein the processor control circuit determines whether a difference between a value of the holding data and a previous value of the holding data is greater than a predetermined value.

13. The power controller according to claim 12, wherein if the difference is greater than the predetermined value, then the selector outputs the second output signal as the third output signal.

14. The power controller according to claim 12, wherein if the difference is not greater than the predetermined value, then the selector outputs the second output signal as the first output signal.

15. The power controller according to claim 11, wherein
    the processor initiates an operation of outputting the first output signal by receiving the clock signal from the processor control circuit, and deactivates the operation of outputting the first output signal by stopping the receipt of the clock signal.

16. The power controller according to claim 11, wherein:
    the processor control circuit stops an operation of the processor when a difference between the first voltage and a voltage of the third output signal is less than a predetermined value.

* * * * *